United States Patent [19]

Voilmy et al.

[11] Patent Number: 5,734,141
[45] Date of Patent: Mar. 31, 1998

[54] APPARATUS FOR AUTOMATICALLY REPLACING WELDING ELECTRODES

[75] Inventors: Laurent Voilmy, Jouy Le Moutier; Didier Rigaux, Houlbec-Cocherel, both of France

[73] Assignee: 3016030 Canada Inc., Montreal, Canada

[21] Appl. No.: 426,176

[22] Filed: Apr. 21, 1995

[30] Foreign Application Priority Data

Apr. 22, 1994 [CA] Canada ................. 2,121,988

[51] Int. Cl.⁶ ......................... B23K 11/31; B23K 11/36
[52] U.S. Cl. ................. 219/86.25; 219/86.8; 279/106
[58] Field of Search .................. 219/86.1, 86.25, 219/86.7, 86.8; 279/106

[56] References Cited

U.S. PATENT DOCUMENTS

| | | | |
|---|---|---|---|
| 3,016,245 | 1/1962 | Zelewsky | 279/106 |
| 4,794,221 | 12/1988 | Takabe et al. | 219/86.8 |
| 4,935,595 | 6/1990 | Fuse | 219/86.25 |
| 5,073,692 | 12/1991 | Jackson et al. | 219/86.8 |
| 5,387,774 | 2/1995 | Boyer et al. | 219/86.33 |
| 5,495,663 | 3/1996 | Saito | 29/762 |

FOREIGN PATENT DOCUMENTS

| | | | |
|---|---|---|---|
| 2 653 047 | 4/1991 | France | 219/86.8 |
| 2 653 047 A | 4/1991 | France . | |
| 91 13678 | 11/1991 | France . | |
| 34 27 366 | 2/1986 | Germany . | |
| 3427366 A1 | 2/1986 | Germany . | |
| 35 15 597 | 10/1986 | Germany | 219/86.8 |
| 3-184673 | 8/1991 | Japan . | |

*Primary Examiner*—Teresa J. Walberg
*Assistant Examiner*—J. Pelham
*Attorney, Agent, or Firm*—Fish & Richardson P.C.

[57] ABSTRACT

A double extractor and an electrode supply station are provided for automatically replacing electrodes in opposing jaws of a resistance welding machine. With coated sheet steels now used for car body structures, it is found that electrodes must be replaced more often. The automatic replacement system is programmed to replace electrodes when the welding machine is idle such as between the movement of car bodies or other structures moving on a conveyor. A double extractor has a first position for extracting top electrodes and a second position for extracting bottom electrodes. Both positions have a plurality of gripping fingers operated by a cam, which simultaneously twist and pull-off the electrodes from the jaw. After the jaw has been removed, the gripping fingers release the old electrode.

17 Claims, 6 Drawing Sheets

APPARATUS FOR AUTOMATICALLY REPLACING WELDING ELECTRODES

TECHNICAL FIELD

The present invention relates to resistance welding machines and more specifically to a method and apparatus for replacing welding electrodes on the jaws of resistance welding machines.

BACKGROUND ART

Resistance welding machines are used today in the construction of steel frames and particularly in the automobile industry for the assembly of car bodies. The welding machine has two jaws controlled by a robot arm. The jaws have electrodes at their ends and clamp a portion of a car body together which is then resistance welded in the clamped area between the two electrodes. After welding the jaws open and the robot arm moves the jaws away to weld in another location. The car body is generally transported on a conveyor which stops at different positions for the body to be welded. Several welding machines may be provided at different positions, or one machine can be moved by the robot arm to weld in several different locations on the body.

Some of the sheet steel used in today's cars has been specially treated for corrosion properties such as being galvanized or electro zinc coated. This coating can cause premature electrode erosion, thus there is a need to replace these electrodes frequently.

The electrodes consist of metal compositions generally with copper included for good conduction of electricity. The electrode is in the form of a tip that fits over a fitting in the jaw which generally provides water cooling to prevent overheating. The electrode is generally pushed into place on the jaw and remains in place as a tight fit on the fitting in the jaw. For the purposes of the present application, the electrode tip is defined as the electrode.

Electrodes are generally made so that as they wear they can be dressed to remove weld spatter and provide a desired tip profile. In some embodiments a rotary electrode dressing tool is provided close by the robot arm so that the robot arm can position the jaws in a clamped configuration the tool, thus permitting both electrodes to be machined at the same time.

There are existing devices to replace electrodes from the jaws of a welding machine. One such arrangement is shown in French patent application 91 13678 filed Nov. 6, 1991. This application shows a device that grips an electrode in a single gripping holder, so the top electrode and the bottom electrode can be removed by the same gripping device. A magazine for holding new electrodes, alternately facing upwards and downwards, allows the top jaw and the bottom jaw to alternately replace electrodes.

DISCLOSURE OF INVENTION

The present application provides a double extractor with a first position for extracting a top or first electrode from a top or first jaw and a second position for extracting a bottom or second electrode from a bottom or second jaw. Preferably, provision is also made for automatically discarding used electrodes from the first and second positions of the double extractor so that it is always ready for use.

The present invention also provides an electrode supply station with two pick-up sites, associated with the double extractor. A first pick-up site for inserting a new top or first electrode onto a top or first jaw and then pushing the electrode into position between the clamped jaws, a second pick-up site provides for inserting a new bottom or second electrode onto a bottom or lower jaw. The operation of the two jaws is by robot control and can be programmed in the same way that the robot arm moves the electrodes to weld car bodies and other structures.

The double extractor and the electrode supply station are positioned side-by-side on a stand and in one embodiment a rotary electrode dressing tool is associated with these two devices. The robot control is arranged to machine both top and bottom electrodes until they are sufficiently worn that they have to be replaced. The robot control then automatically replaces the two electrodes. All of the electrode replacement operations are performed when the welding machine is idle, such as when one body or structure has been welded, and a new body is being moved to a position to commence welding, thus no time is wasted between welding operations.

As embodied and broadly described herein, the present invention provides an apparatus for automatically replacing electrodes from jaws of a resistance welding machine comprising:

- a double extractor having a first retaining position to retain electrodes from a first jaw of the welding machine and a second retaining position on the opposite side of the extractor to retain electrodes from a second jaw of the welding machine;
- each retaining position having a plurality of gripping fingers operated by a cam, to grip an electrode;
- means to rotate the cam in one direction for moving the gripping fingers inwards to grip an electrode and move the electrode away from the jaw to separate the electrode from the jaw; and
- means to rotate the cam in the opposite direction to reject the electrode from the retaining position.

In another embodiment there is provided with the double extractor, an electrode supply station having a first electrode pick-up rotatable magazine and a second electrode pick-up rotatable magazine, side-by-side, for holding electrodes, the first magazine having electrodes for removal on one side of the supply station by the first jaw and the second magazine having electrodes for removal on the opposite side of the supply station by the second jaw, indexing means for each of the first magazine and the second magazine to locate the magazine at an angular position at which a fresh electrode is presented to be picked-up by the first jaw or the second jaw of the welding machine.

As embodied and broadly described herein, the invention further provides a process for automatically replacing electrodes on opposing jaws of a resistance welding machine comprising the steps of: moving a first jaw having a first electrode thereon, and a second jaw having a second electrode thereon, to a first extraction position; lowering the first jaw with the first electrode thereon down into the first extraction position; gripping the first electrode and separating the first electrode from the first jaw; moving the first jaw and the second jaw back from the first extraction position and to a first electrode replacement position, lowering the first jaw down to engage a first replacement electrode; closing the first jaw and the second jaw so the first replacement electrode is pressed into the first jaw; moving the first jaw and the second jaw back from the first replacement position and to a second extraction position; raising the second jaw with the second electrode thereon into the second extraction position; gripping the second electrode and separating the second electrode from the second jaw;

moving the first jaw and the second jaw back from the second extraction position and to a second replacement position; raising the second jaw upwards to engage a second replacement electrode; closing the first jaw and the second jaw so the second replacement electrode is pressed onto the second jaw, and moving the first jaw and the second jaw back from the second replacement position.

BRIEF DESCRIPTION OF THE DRAWINGS

In drawings which illustrate embodiments of the present invention:

FIG. 2b is a graph depicting the pattern of the races shown in FIG. 2a;

BEST MODE FOR CARRYING OUT THE INVENTION

Figure 1:
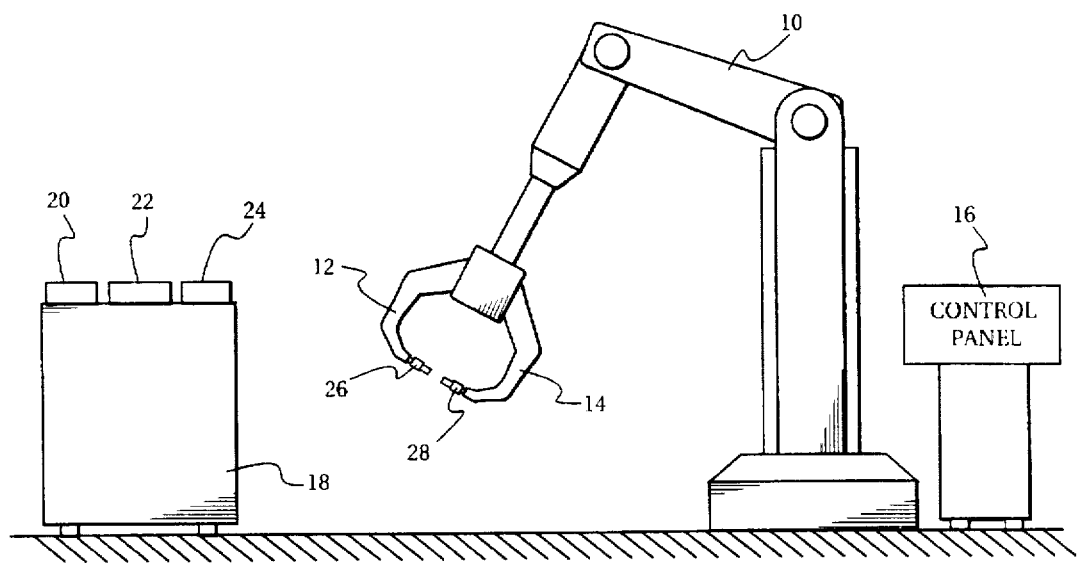
FIG. 1 is a schematic view showing a robot arm arrangement with welding jaws positioned adjacent a stand containing an electrode dressing tool, a double extractor and a supply station for electrodes according to an embodiment of the present invention.

Referring now to the drawings, FIG. 1 shows a robot arm 10 having a first jaw 12 opposing a second jaw 14. The jaws 12, 14 are not illustrated to scale and may open a considerable distance to pass around structures for welding. The jaws 12, 14 clamp together and electric resistance welding occurs where the elements are clamped. Control of the robot arm 10 is from a control panel 16 having a computer that is programmable to suit the particular body being welded and also to control movements and the arm and hence the jaws 12, 14 for dressing the electrodes and replacing the electrodes.

A support base 18 is positioned adjacent to the robot arm 10 so that the arm is able to move the jaws 12, 14 to an electrode dressing tool 20 (of the type described in the Canadian patent application filed on Apr. 22, 1994 in the name of 3016030 Canada Inc.), a double extractor 22 and an electrode supply station 24. The double extractor 22 and electrode supply station 24 will be described in more detail hereafter.

Figure 2:
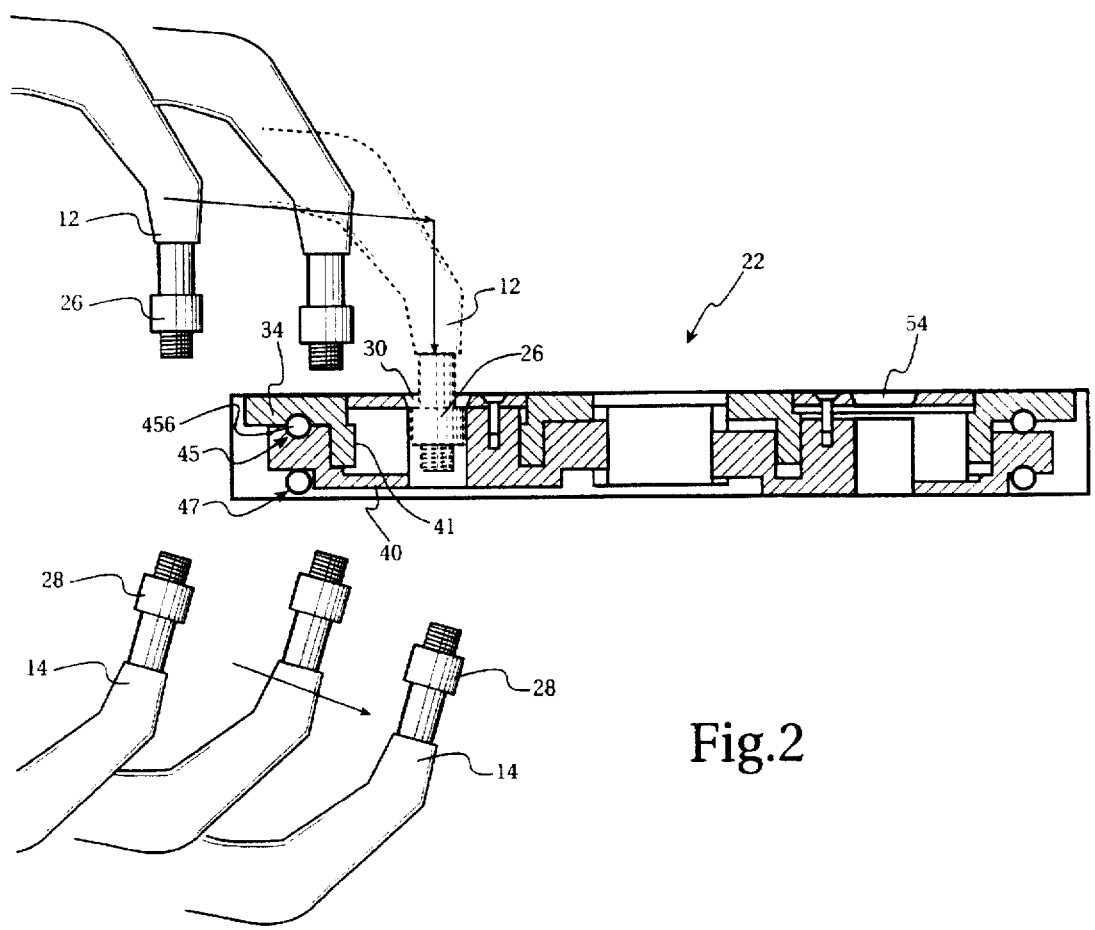
FIG. 2 is a vertical sectional view showing a double extractor according to one embodiment of the present invention showing the jaws of a welding machine in three positions approaching the extractor.
Figure 3:
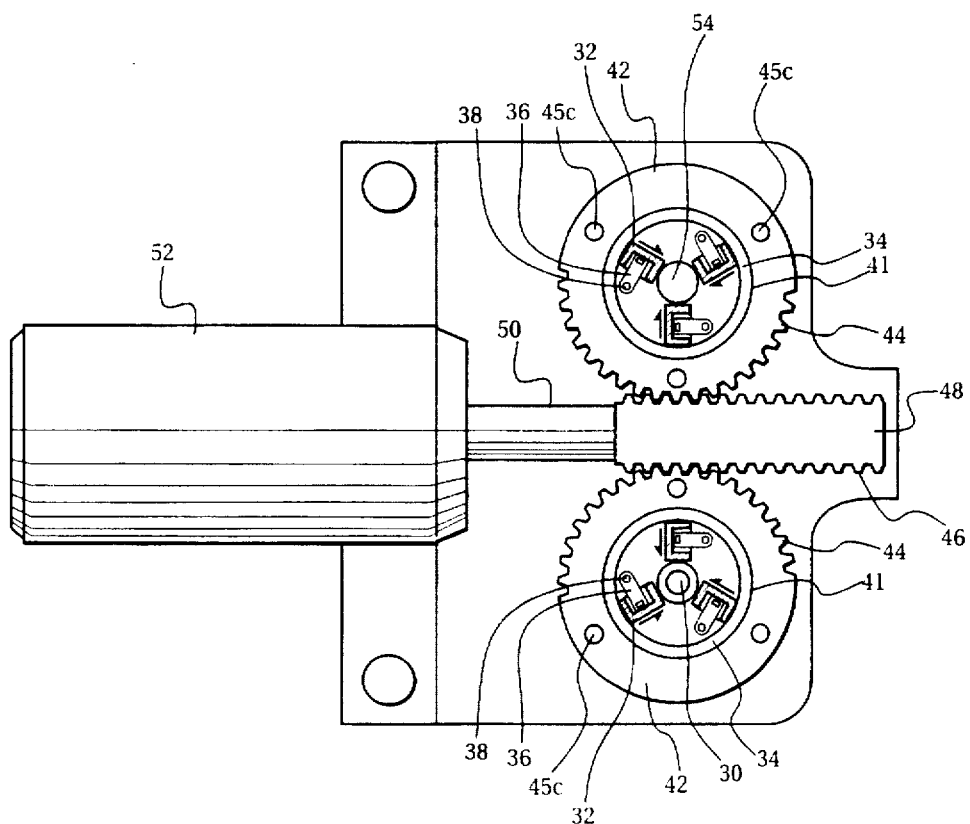
FIG. 3 is a top view of the extractor shown in FIG. 2, some working parts being shown in cross-section for clarity.

At the end of the first jaw 12 is mounted a first electrode 26 and at the end of the second jaw 14 is mounted a second electrode 28. FIG. 2 illustrates the double extractor 22 in somewhat more detail showing a first electrode 26 on the end of the first jaw 12 moving in three locations until it is finally located in a first retaining position 30 of the double extractor 22. As shown in FIG. 3, the first retaining position 30 has three radial gripping fingers 32 equi-spaced about a center position to hold the first electrode 26. The fingers 32 are within a stationary cam ring 34 which has internal curved surfaces reducing in diameter to provide a cam action. When the gripping fingers rotate relative the cam 34, the fingers 32 are caused to move inward to grip an electrode. The fingers 32 have support arms 36 extending to pins 38 which are fixed to guide blocks 40 as shown in FIG. 2, that are formed integrally with a partial gear 42 to be described later. The fingers 32 fit into internal spiral grooves (not shown) within the internal curved surfaces of the cam ring 34 such that relative rotation between the cam ring 34 and the fingers 32 not only moves the fingers 32 inward to grip an electrode, but also moves the fingers away from the jaw thus separating the electrode from the jaw.

The cam ring 34 is contained within a circular groove 41 machined on the upper surface of the partial gear 42. The circular groove surrounds the trio of guide blocks 40 that direct the radial movement of the fingers 32. The cam ring 34 is fixed to the frame of the machine so that when the partial gear 42 rotates a relative movement is developed between the cam 34 and the fingers 32.

Figure 2A:
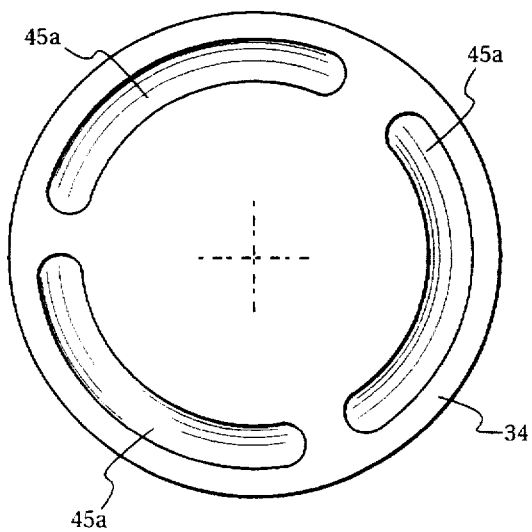
FIG. 2a is a plan view of a cam plate illustrating the location of ramp-shaped races of a ball bearing assembly.
Figure 2B:
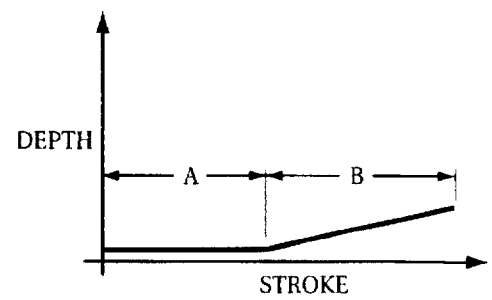

A ball bearing assembly 45 is provided between the partial gear 42 and the stationary cam 34 to allow the partial gear to undergo a compound axial and rotary movement. FIG. 2a is a fragmentary plan view of the cam 34 showing the surface of the cam that faces the partial gear 42. That surface includes three races 45a shaped as circle sectors having an angular extent of 105 degrees. FIG. 2b is a graph illustrating the profile of each race 45a. The initial segment A of each race is a flat surface. The remaining segment B, however, is a ramp. The ball bearing assembly 45 also includes three spherical balls 45b held captive in individual semi-spherical recesses 45c on the partial gear 42, the balls 45b riding in individual races 45a on the cam 34. During the initial phase of the rotary movement of partial gear 42, when the balls 45a are in segments A of respective races 45a, the axial component of the partial gear 42 movement is nil since segments A are orthogonal to the rotation axis. However, when the balls 45b engage segments B the partial gear 42 moves axially downwardly.

The partial gear 42 is supported at its lower end by a ball bearing assembly 47 identical to assembly 45, that causes this time the partial gear 42 to rise when rotated in a direction opposite the direction that induces the descending axial movement. In short, the ball bearing assemblies 45 and 47 constitute an agency to axially displace the partial gear 42 in one direction when the later is turned clockwise and to displace the partial gear in the opposite axial direction when the gear is rotated counter clockwise.

The partial gear 42 has teeth 44 that engage in teeth of a rack 48 attached to a shaft 50 of a pneumatic cylinder 52. Thus, movement of the rack 48 by the cylinder causes the partial gear 42 to rotate which results in:

a) first the fingers 32 move radially inwardly to grip the electrode 26. During this phase of the movement the balls of the ball bearings ride in segments A so no axial movement of the partial gear 42 is produced: and b) a continued rotation of the partial gear causes the latter to move downwardly so as to simultaneously twist and pull away the electrode from the first jaw 12.

Such compound extraction movement has been found particularly advantageous for removing electrodes provided with a tapered recess that is forced over a complementary projection on the jaw to achieve a friction fit.

The second retaining position 54 is provided for retaining the second electrode 28 on the end of the second jaw 14, and the gripping device is identical to that of the first retaining position 30 except that the electrode is inserted from underneath rather than on top, the second electrode 28 is gripped by the fingers 32 in the second retaining position 54 and raised upwards to separate from the second jaw 14.

After an electrode has been separated from a jaw, the jaws 12, 14 are moved back and the pneumatic cylinder 52 operates to loosen the fingers 32 thus dropping the used electrodes from the extractor.

Figure 4:
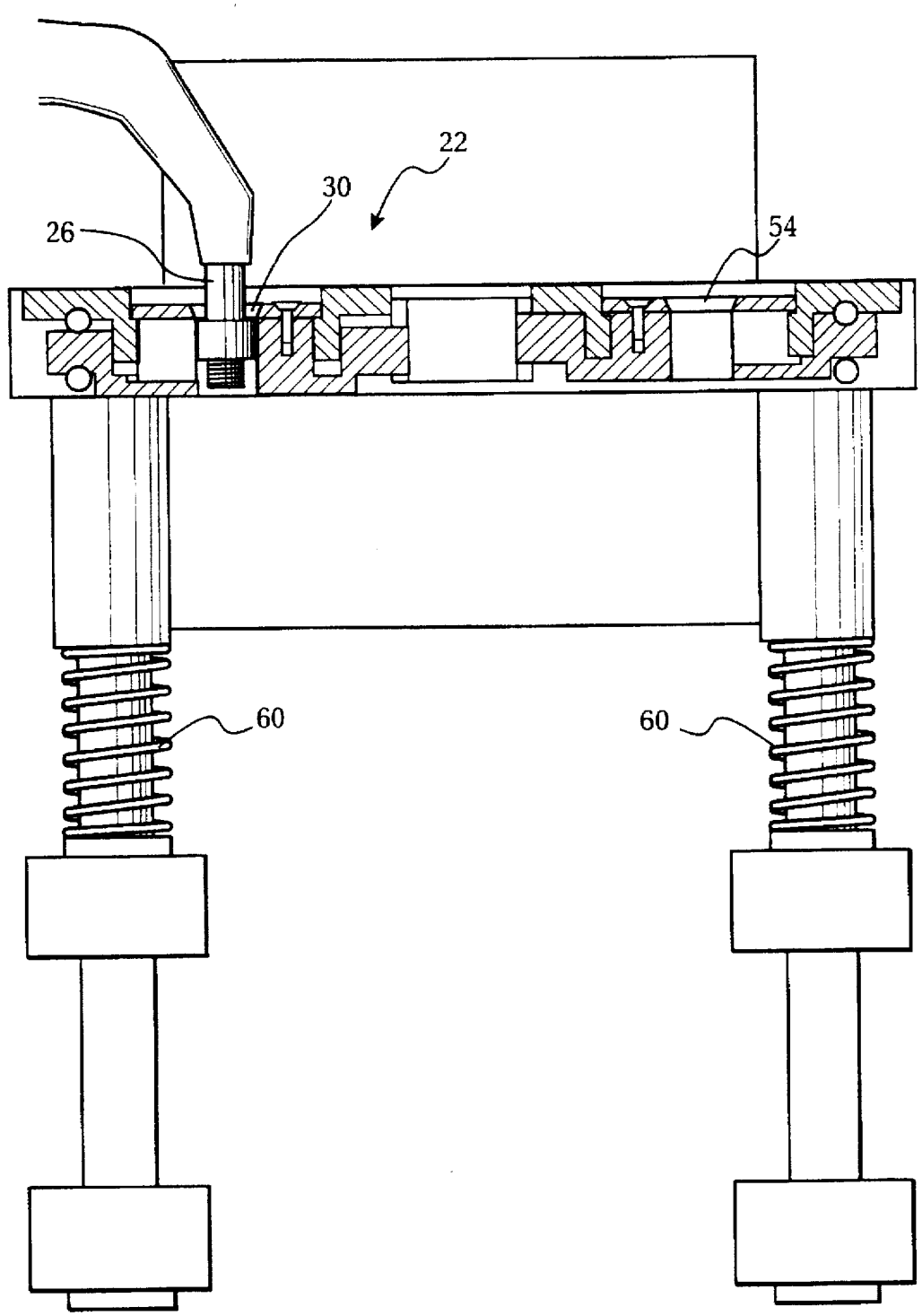
FIG. 4 is an elevational view, partly in section, showing the spring mounting arrangement of the double extractor.

A double extractor 22 as shown in FIG. 4 is mounted on springs 60 thus permitting there to be a flexible mounting to cushion movement between the jaws and the extractor. If desired the floating suspension may beextended to the X-Y horizontal plane as well to provide a three-axial cushioning effect capable to buffer impact forces irrespective of the direction of impact of the jaws against the extractor. Such X-Y cushioning could be achieved in a variety of ways, such as by connecting the extractor with large springs that yield against forces acting against the extractor in the horizontal plane.

Figure 5:
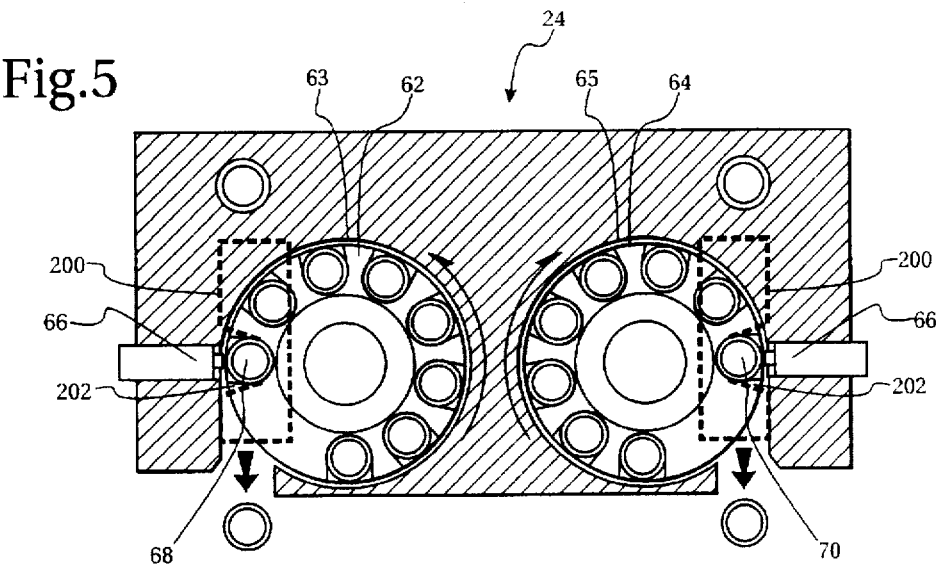
FIG. 5 is a top plan view showing an electrode supply station with dual electrode pick-up sites according to one embodiment of the present invention.

One embodiment of the electrode supply station 24 is shown in FIG. 5 and comprises a first rotatable magazine 62 that rotates in a first compartment 63 and a second rotatable magazine 64 that rotates in a second compartment 65. The first magazine 62 holds electrodes to be attached to the first jaw 12 and the second magazine 64 holds electrodes to be attached to the second jaw 14. Optical sensors 66 are provided for both the first magazine 62 and the second magazine 64. The sensors 66 signal to the computer that there is a replacement electrode in pick up positions of the magazine. The magazines 62, 64 rotate in opposite directions. The first magazine 62 rotates to place a replacement electrode into a first pick up position 68. The magazine is preferably made of plastic material and holds an electrode by friction fit preventing it from falling. In this position the first jaw 12 comes down and inserts the connecting tube (not shown, but which forms the end of the jaw) into the replacement electrode 68. The second jaw 14 is closed to clamp the two jaws together, thus pushing the replacement electrode 68 onto the top jaw 12. The two jaws 12, 14 are then pulled back from this first pick up position 68 by the robot arm 10, and this movement rotates the magazine 62 so that another electrode is positioned in the first pick up position 68 ready for the next replacement.

Figure 6:
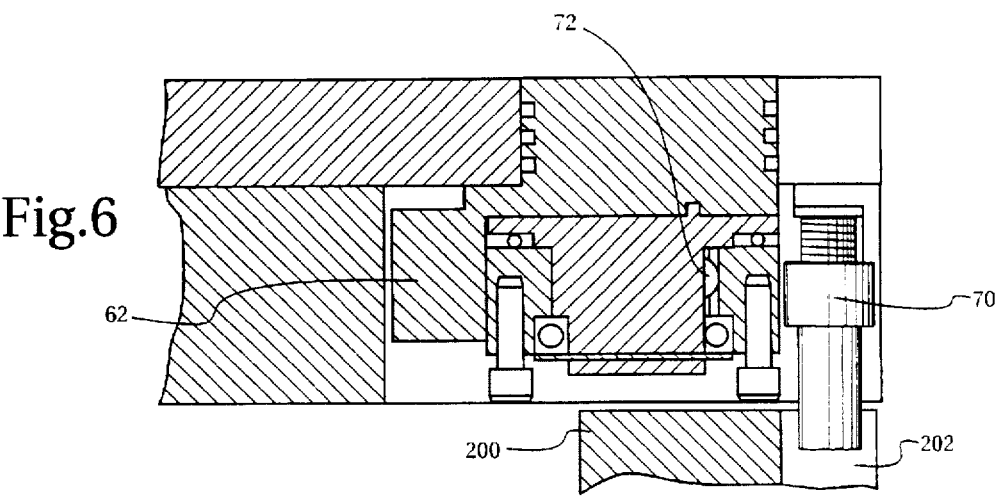
FIG. 6 is a partial sectional view showing the electrode supply station depicted in FIG. 5.

In the second magazine position 64, a second pick up position 70 is shown. Details of this are illustrated in FIG. 6 with a replacement electrode in the second pick up position 70 for engagement by second jaw 14 being raised up. Similarly, the two jaws 12, 14 are closed together so that the second replacement electrode is pushed onto the second jaw 14. The robot arm 10 then pulls back the jaws 12, 14, causing the magazine to rotate in order to position another electrode in the second pick up position 70.

Figure 7:
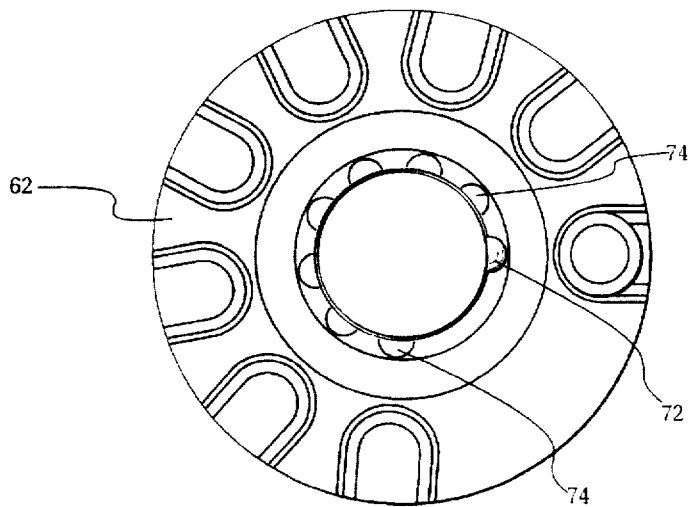
FIG. 7 is a detail plan view showing a rotary electrode magazine of the supply station depicted in FIGS. 5 and 6.

Details of the indexing mechanism are shown in FIG. 7 for the first magazine 62 with an indexing protrusion 72 shown to fit within indexing grooves 74. Each time the electrode on a jaw is pulled back, the magazine indexes to the next position to ensure that replacement electrodes are moved to pick up positions 68 and 70.

For an accurate alignment between the jaws 12, 14 and the electrodes in the pick-up positions 68 and 70 is preferred to provide the electrode supply station 24 with an alignment accessory that precisely guides the movement of the jaws immediately before they grab fresh electrodes from the magazines 62, 64. More particularly, a pair of alignment blocks 200 (shown with dashed lines in FIGURE) are provided, formed with V-shaped recesses 202 in line with the respective pick-up positions 68 and 70. When a jaw of the welding machine approaches the magazines 62, 64 it is forced into the groove defined by the V-shaped recess 202 and follows a precise course leading to the electrode at position 68, 70.

Figure 8:
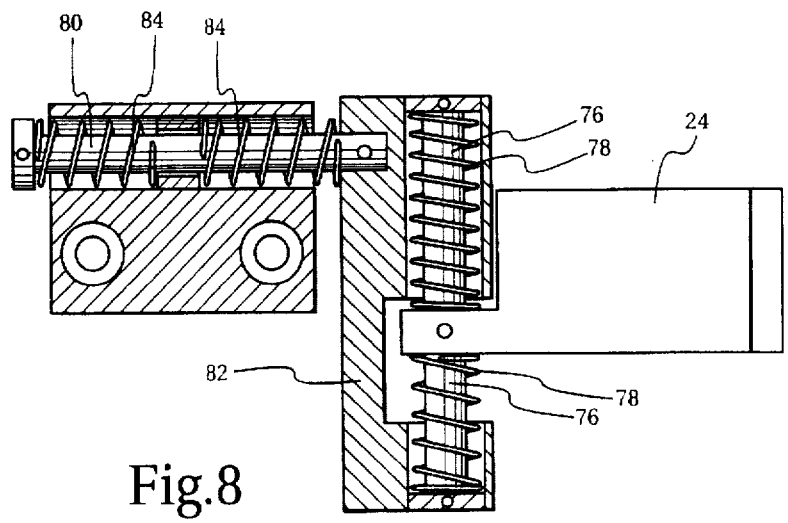
FIG. 8 is a sectional view showing a mounting arrangement for the electrode supply station of FIG. 5.

The electrode supply station 24 is shown in FIG. 8 mounted for vertical movement on shaft 76 which has springs 78 for positioning and providing a cushioning effect for the supply station 24. Horizontal shafts 80 attached to a support 82 which holds the vertical shaft 76, and springs 84 are provided so that the electrode supply station 24 can move up and down and away from the support base 18. Thus, when the electrodes are being picked-up, the electrode supply station 24 is cushioned to allow ease of pulling the electrodes back from the magazines.

Figure 9:
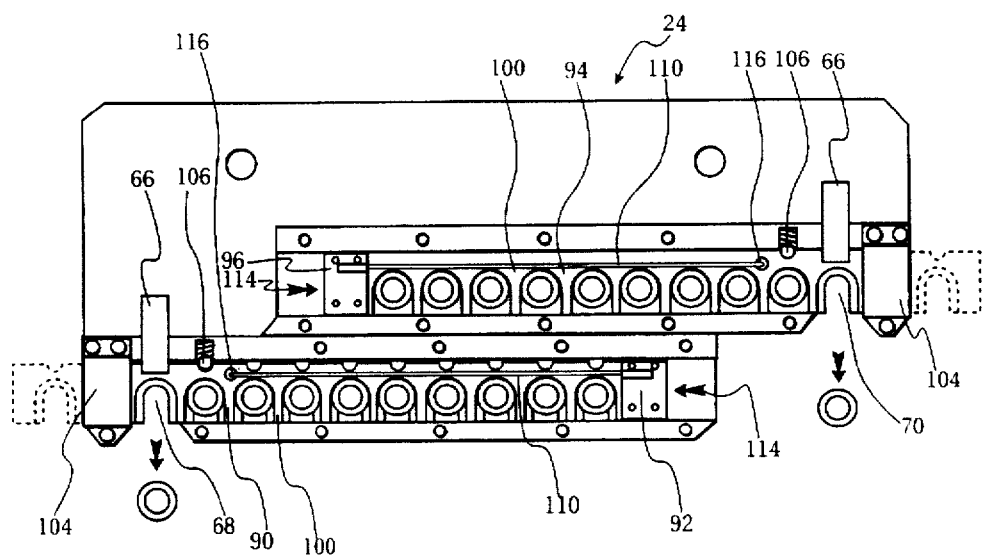
FIG. 9 is a top plan view showing another embodiment of an electrode supply station according to the present invention.
Figure 10:
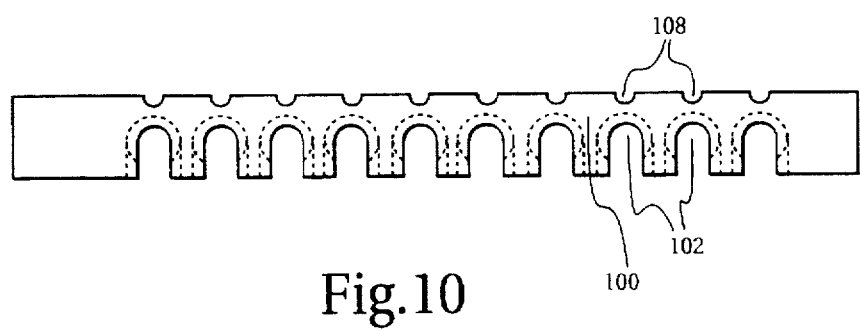
FIG. 10 is a schematical view of a linear magazine of the electrode supply station shown in FIG. 9.

Another embodiment of an electrode supply station 24 is shown in FIG. 9 wherein a first track 90 is shown containing a row of replacement electrodes mounted on a linear magazine 100, best shown in FIG. 10. The magazine is made of plastic material and it is shaped as a strip and has a plurality of pockets 102 that frictionally hold individual electrodes. Referring back to FIG. 9, the linear magazine 100 is displaced laterally by a pushing arm 92 to present an electrode onto a first pick up position 68. Similarly, a second track 94 is provided containing a magazine 100 of replacement electrodes with a second pushing arm 96 to push the magazine 100 so as to present an electrode at the second pick up position 70. The empty pockets of magazines 100 project laterally from the supply station 24 as shown in dotted lines. Abutments 104 are provided in order to hold the forwardmost electrodes in the pick-up positions 68 and 70. It will be apparent that the abutments 104 are provided with passages (not shown) through which the empty portions of the magazines 100 pass. It is also preferable to provide the electrode supply station 24 with an indexing mechanism allowing the magazines 100 to move stepwise in their respective tracks. The indexing mechanism includes detent balls 106 engaging conforming recesses 108 formed on the magazines 100. The recesses 108 register with the respective electrode holding pockets 102.

The pushing arms 92 and 96 are displaced by means of cables 110 pulled in the direction of the arrows 112 and 114 to cause the magazines 100 to move. The cables 110 run along the respective tracks 90 and 94 and enter into apertures 116 to connect to a pulling device. In its simplest form, such pulling device is a coil spring (not shown in the drawings) mounted under the electrode supply station and having one end connected to the cable from track 90 and another end connected to the cable from track 94. In a variant, the pulling device is constituted by a weight connected to a cable segment that interconnects cables 110 from tracks 90 and 94.

Figure 11:
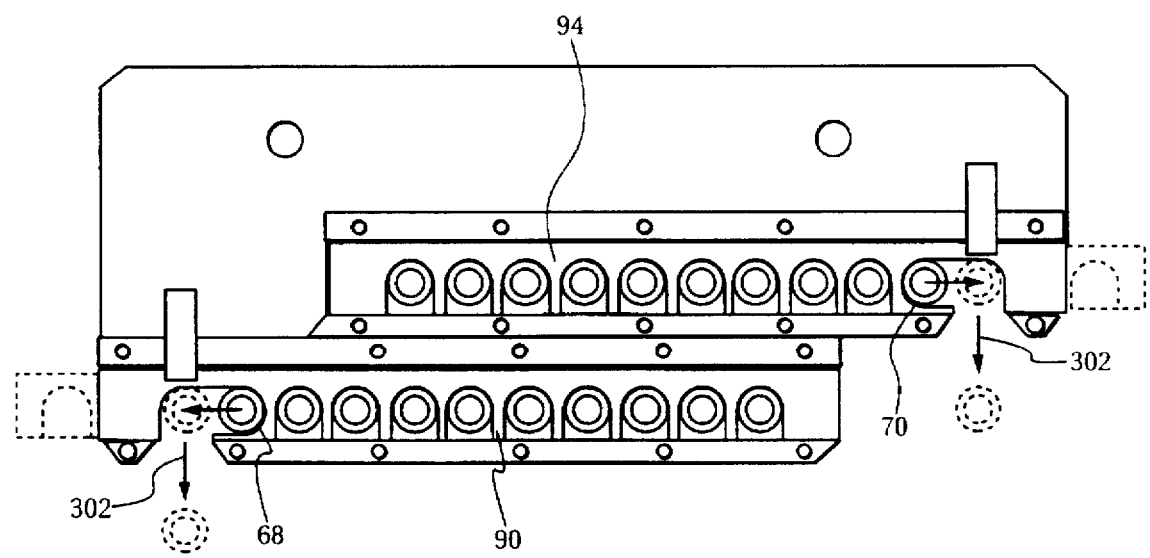
FIG. 11 is a variant of the electrode supply station shown in FIG. 9.

FIG. 11 illustrates a variant of the electrode supply station depicted in FIG. 9. The difference between the two embodiments resides in the agency for displacing the magazines 100 that contain the electrodes. FIG. 11 shows an arrangement 300 that features non-rectilinear pathways 302 from the electrode pick-up positions to the outside of the tracks 90, 94. When the jaws 12, 14 of the welding machine are furnished with fresh electrodes at pick-up stations 68, 70, the jaws can be removed from the supply station 300 by following a first segment of the pathway that extends along the axis of the respective track. This movement causes the respective magazine 100 to advance one step and bring a fresh electrode in the pick-up position. Next, the jaw follows the terminal segment of the pathway 302 which is perpendicular to the longitudinal axis of the magazine. The movement extracts the electrode from the magazine 100 and releases the jaw from the supply station 300.

In operation the robot arm 10 moves the jaws 12, 14 to the first retaining position 30 of the double extractor 22. The first jaw 12 is moved downwards so the first electrode 26 is positioned in the first retaining position 30. The gripping fingers 32 twist and simultaneously pull-off the first electrode 26, the jaws 12, 14 are then moved back from the double extractor 22. After they have moved back, partial gear 42 in the first retaining position 30 is rotated to open the fingers 32 in order to release the first electrode 26 which drops from the double extractor 22. The jaws 12, 14 are then moved by the robot arm 10 to the first pick up position 68 on the electrode supply station 24, the first jaw 12 is moved down to engage a replacement electrode in the first pick up position 68. The jaws 12, 14 are clamped together and this action pushes the replacement electrode onto the first jaw 12. The jaws 12, 14 are then pulled back from the first pick up position 68, which action indexes the first magazine 62, and are then moved to the second retaining position 54 of the double extractor 22. The second jaw 14 containing the second electrode 28 is raised into the second extraction position 54, gripped by the gripping fingers 32 and separated from the second jaw 14. The jaws 12, 14 are then moved back from the second extraction position, and the gripping fingers 32 release the second electrode 28 so that it drops from that position. The jaws 12, 14 move to the second pick up position 70 of the supply station 24 and the second jaw 14 is raised to engage a replacement electrode in the second pick up position 70. Again the jaws 12, 14 are clamped together. This time the upper jaw 12 forces the replacement electrode onto the lower jaw 14. The jaws are then pulled back from the second pick up position, which action indexes the second magazine 64. Replacement electrodes are now attached to both the top jaw 12 and the bottom jaw 14. This operation occurs in a matter of seconds and between the time that it takes for a new work structure to be positioned in location for welding.

The operation of the supply station 24 is substantially the same for the device shown in FIG. 5, and for the device shown in FIGS. 9 and 11.

Various changes may be made to the embodiments shown herein without departing from the scope of the present invention which is limited only by the following claims.

The embodiments of the present invention in which an exclusive property or privilege is claimed are defined as follows:

1. An apparatus for automatically replacing electrodes from jaws of a resistance welding machine comprising:
   (a) a double extractor having a first retaining position to retain electrodes from a first jaw of the welding machine and a second retaining position on the opposite side of the extractor to retain electrodes from a second jaw of the welding machine, each retaining position having a plurality of gripping fingers to grip an electrode;
   (b) driving means for moving the gripping fingers inwards to grip an electrode and move the electrode away from the jaw to separate the electrode from the jaw; and
   (c) a cam engaging the gripping fingers relative movement between the cam and the gripping fingers causing movement of the gripping fingers inwardly and away from the jaws to separate the electrode from the jaws.

2. An apparatus as defined in claim 1, wherein said driving means causes said fingers to move over an angular sector while engaging the first or second electrode in order to turn the first or second electrode and pull the first or second electrode at the same time.

3. An apparatus as defined in claim 2, further comprising means for producing a relative movement between said cam and said fingers such that said cam causes said fingers to release the electrode.

4. The apparatus for automatically replacing electrodes according to claim 3, wherein the double extractor is elastically mounted onto a support table.

5. The apparatus for automatically replacing electrodes according to claim 3, wherein the cam is a ring cam, said gripping fingers being movable with relation to said cam which causes said fingers to move radially in and out and also away from the jaw holding an electrode.

6. The apparatus for automatically replacing electrodes according to claim 5, further comprising a gear engaging a rack and means for moving the rack to cause said gear to rotate, said fingers being mounted to said gear, whereby movement of said gear causes displacement of said fingers relative to said cam.

7. The apparatus for automatically replacing electrodes according to claim 3, including a double loader having a first rotatable magazine and a second rotatable magazine, side-by-side for holding electrodes, the first magazine having electrodes for removal on one side of the loader by the first jaw and the second magazine having electrodes ready for removal on the opposite side of the loader by the second jaw;
   indexing means for each of the first magazine and the second magazine to rotate the magazine for an electrode to advance to a pick up position to be picked up by the first jaw or the second jaw of the welding machine.

8. The apparatus for automatically replacing electrodes according to claim 7, including sensor means to ensure an electrode is positioned in the pick up position for the first or second jaw of the welding machine.

9. The apparatus for automatically replacing electrodes according to claim 8, wherein the double loader is elastically mounted onto a support table.

10. The apparatus for automatically replacing electrodes according to claim 7, wherein the double extractor and the double loader are positioned side-by-side.

11. The apparatus for automatically replacing electrodes according to claim 10, including a milling machine placed in line with the double extractor and the double loader, the milling machine to mill ends of the electrodes supported by the jaws.

12. The apparatus for automatically replacing electrodes according to claim 3, including a double loader for holding a plurality of electrodes on a first track and a plurality of electrodes on a second track;
   the first track having a first exit end with a first pick up position for electrodes to be picked up by a first jaw and the second track having a second exit end with a second pick up position for electrodes to be picked up by the second jaw;
   first pushing means for the first track to push a next electrode on the first track into the first pick up position;
   second pushing means for the second track to push a next electrode on the second track into the second pick up position; and
   indexing means to move the next electrodes individually to the first or second pick up positions after electrodes have been picked up by the jaws.

13. The apparatus for automatically replacing electrodes according to claim 12, including sensor means to ensure an electrode is positioned in the first pick up position or the second pick up position.

14. A process for automatically replacing electrodes on opposing jaws of a resistance welding machine comprising the steps of:

moving a first jaw having a first electrode thereon and a second jaw having a second electrode thereon to a first extraction position, lowering the first jaw with the first electrode thereon down into the first extraction position;

causing a cam to engage gripping fingers such that relative movement between the cam and the gripping fingers results in movement of the gripping fingers inwardly and away from the first jaw and thereby gripping the first electrode and turning the first electrode while pulling the first electrode away from the first jaw to separate the first electrode from the first jaw;

moving the first jaw and the second jaw back from the first extraction position and to a first electrode replacement position;

lowering the first jaw down to engage a first replacement electrode;

closing the first jaw and the second jaw so the first replacement electrode is pressed onto the first jaw;

moving the first jaw and the second jaw back from the first electrode replacement position and to a second extraction position;

raising the second jaw with the second electrode therein upwards into the second extraction position;

gripping the second electrode and turning the second electrode while pulling the second electrode away from the second jaw to separate the second electrode from the second jaw;

moving the first jaw and the second jaw back from the second extraction position and to a second replacement position;

raising the second jaw upwards to engage a second replacement electrode;

closing the first jaw and the second jaw so the second replacement electrode is pressed onto the second jaw; and moving the first jaw and the second jaw back from the second replacement position.

15. The process for automatically replacing electrodes according to claim 14, wherein the first electrode is gripped in the first extraction position by a first gripping means, and the second electrode is gripped in the second extraction position by a second gripping means, and wherein the first gripping means and the second gripping means reject electrodes gripped therein after the first jaws and the second jaws have moved back from the extracted position.

16. An apparatus for automatically extracting an electrode from a jaw of a welding machine, comprising:

a plurality of gripping fingers capable of engaging an electrode retained to the jaw of the welding machine, said fingers simultaneously turning the electrode and pulling the electrode away from the jaw of the welding machine; and a cam engaging the gripping fingers, the relative movement between the cam and the gripping fingers causing movement of the gripping fingers inwardly and away from the jaw to separate the electrode from the jaw.

17. An apparatus as defined in claim 3, wherein said cam and said fingers are movable relative to one another to cause said fingers to release the electrode.

* * * * *

UNITED STATES PATENT AND TRADEMARK OFFICE
CERTIFICATE OF CORRECTION

PATENT NO.   : 5,734,141

DATED        : March 31, 1998

INVENTOR(S)  : Laurent VOILMY et al.

It is certified that error appears in the above-identified patent and that said Letters Patent is hereby corrected as shown below:

```
Column 4, line 55, insert --42-- after "gear";
         line 57, insert --46-- after "teeth";
         line 59, insert --52-- after "cylinder".

Column 5, line 19, replace "beextended" with --be
extended--.
```

Signed and Sealed this

Sixteenth Day of June, 1998

*Attest:*

BRUCE LEHMAN

*Attesting Officer*           Commissioner of Patents and Trademarks